United States Patent [19]

Walden

[11] 4,346,332

[45] Aug. 24, 1982

[54] FREQUENCY SHIFT INVERTER FOR VARIABLE POWER CONTROL

[75] Inventor: John P. Walden, Schenectady, N.Y.

[73] Assignee: General Electric Company, Schenectady, N.Y.

[21] Appl. No.: 177,942

[22] Filed: Aug. 14, 1980

[51] Int. Cl.³ .................... H05B 41/29; H05B 41/392
[52] U.S. Cl. ..................................... 315/307; 315/224; 315/244; 315/291; 315/DIG. 4
[58] Field of Search ................... 315/209 R, 224, 244, 315/307, 308, 311, DIG. 7, 291, DIG. 4; 328/69, 146, 147

[56] References Cited

U.S. PATENT DOCUMENTS

| | | | |
|---|---|---|---|
| 3,781,638 | 12/1973 | Anderson et al. | 331/113 A X |
| 3,967,159 | 6/1976 | Dendy et al. | 315/308 X |
| 4,060,752 | 11/1977 | Walker | 315/307 X |
| 4,207,497 | 6/1980 | Capewell | 315/96 |
| 4,207,498 | 6/1980 | Spira | 315/97 |
| 4,210,846 | 7/1980 | Capewell et al. | 315/DIG. 4 |

*Primary Examiner*—Eugene R. La Roche
*Attorney, Agent, or Firm*—Norman C. Fulmer; Philip L. Schlamp; Fred Jacob

[57] ABSTRACT

A variable frequency AC power source drives a gas discharge lamp which is connected in parallel with the capacitance of a series resonant circuit. The polarity of the voltage applied to the resonant circuit is commutated at such times as the rate-of-change of current flow in the resonant circuit is below an adjustable threshold value. The setting of a threshold adjusting circuit determines the brightness of the lamp. The polarity is also commutated at such times as the current flow from the source reaches a predetermined level. Lamp current is thus independently and variably controlled in the variable power mode.

39 Claims, 7 Drawing Figures

FREQUENCY SHIFT INVERTER FOR VARIABLE POWER CONTROL

BACKGROUND OF THE INVENTION

Related Applications

This application is related to the concurrently filed U.S. patent application Ser. No. 183,625 of Victor D. Roberts and John P. Walden, filed Sept. 2, 1980, and assigned to the assignee of this invention, the subject matter of which is hereby incorporated herein by reference.

Field of the Invention

This invention relates to inverter circuits for producing an alternating current output which is regulated to a constant power level independent of load impedance changes, but with the power level adjustable to provide a continuous output power control function. More particularly, this invention relates to inverter circuits for starting, ballasting and dimming (i.e. varying the output power of) gas discharge lamps.

Description of the Prior Art

Inverter circuits are commonly used to produce alternating current power from a direct current source and to effect changes in the voltage level of an alternating or direct current source. It has been common practice to incorporate circuits in inverters which act to regulate and maintain the output current and/or the output voltage of the inverter at a constant value.

It is, in some instances, desirable to utilize an inverter circuit which will supply a constant power level to a load despite changes in the load impedance. Inverters with constant power output are useful, for example, for driving gas discharge lamps in which impedance characteristics vary as a function of the lamp operating conditions. A constant power output is also desirable for charging of energy storage capacitors of the type commonly utilized in photoflash and pulse modulator equipment and for operating variable speed motors at constant power levels.

U.S. Pat. No. 3,781,638 by Thomas E. Anderson and John P. Walden describes a class of alternating current inverter circuits wherein commutation of an output voltage is initiated as load current reaches a predetermined, reference level. Inverters of this class will, therefore, function to regulate and maintain the power input to a load of constant impedance despite changes in the inverter input voltage. The above-mentioned patent disclosure is incorporated herein by reference in its entirety.

The operation of gas discharge lamps with frequency controlled inverters and resonant matching networks is more particularly described in U.S. Pat. No. 4,053,813 by William P. Kornrumpf et al., and U.S. Pat. No. 4,050,571, by Thomas A. Anderson, which are assigned to the assignee of the invention and incorporated herein in their entirety by reference. In accordance with these disclosures, a gas discharge lamp is connected as a damping element across a capacitor of an otherwise high Q series resonant circuit. Prior to ignition, the lamp presents a very high impedance and the Q of the resonant circuit remains high. The circuit is automatically driven at its resonant frequency during this period. Voltage buildup in the high Q circuit provides high voltage necessary for lamp starting. After ignition, the lamp impedance decreases greatly, loading the resonant circuit and lowering its Q. At such times the inductor or a current control circuit act to limit current flow through the negative lamp impedance. Such circuits may not, however, maintain circuit resonance to permit reignition of a partially ionized lamp having an intermediate impedance value.

U.S. Pat. No. 4,060,752 by Loren H. Walker, assigned to the assignee of the present invention and hereby incorporated in its entirety by reference, discloses a circuit in which a variable impedance load (such as a gas discharge lamp) is connected as the damping element in a high Q, resonant output circuit. The output circuit is driven from an AC source, of substantially constant voltage, at a variable frequency near its damped resonant frequency. Constant power can thereby be delivered to a wide range of load impedances. The AC source produces a substantially square wave which is commutated at such times as either (1) the instantaneous load current equals a predetermined reference level or (2) the time derivative of the load current di/dt, is at or near zero. In the "current derivative control" mode the inverter switches polarity at each peak of the resonant current wave and is, therefore, locked near, but not precisely at, the resonant frequency of the output circuit. The peak current control mode acts to define circuit operation at such times as the load cannot accept real power, i.e., for substantially short circuit or open circuit loads.

SUMMARY OF THE INVENTION

An object of the present invention is to provide a circuit for operating an inverter circuit having a regulated power output independent of changes in the load impedance.

Another object of this invention is to provide a circuit for the efficient starting and control (i.e. allowing continuous variation) of the light output of a gas discharge lamp in a stable manner.

A further object of the present invention is to provide a circuit for dimming discharge lamps which does not generate distracting audible noise.

Yet another object of the present invention is to provide a circuit for dimming discharge lamps which maintains stable operation by providing only one point of intersection between the lamp and inverter V-I characteristics.

In accordance with these and other objects which will become apparent, the circuit of the present invention provides a unique system for the dimming of gas discharge lamps by adjusting the operating frequency to regulate current in the output load while maintaining suitable load voltage.

BRIEF DESCRIPTION OF THE DRAWINGS

These and other features of the present invention and the attendant advantages will be readily apparent to those having ordinary skill in the art, and the invention will be more easily understood from the following detailed description of the preferred embodiment of the present invention taken in conjunction with the accompanying drawings wherein.

DETAILED DESCRIPTION OF THE INVENTION

Figure 1:
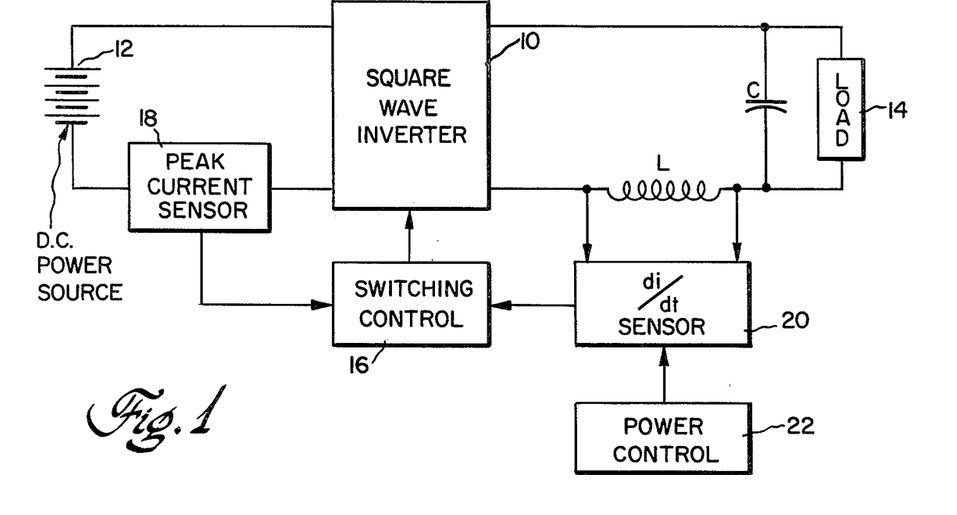
FIG. 1 is a block diagram of the essential circuit elements of the present invention.

FIG. 1, which shows a block diagram of the essential circuit elements of the present invention, is a modification of the circuit described in the abovementioned U.S. Pat. No. 4,060,752 by Loren H. Walker. In contrast to the fixed sensitivity of the current derivative, or di/dt, sensor of that patent, the current derivative sensor of the present invention is adjustable by means of a power control circuit to allow changes in the output power.

As shown in FIG. 1, a square wave inverter 10 is used to convert DC power from a source of direct current 12 which may be, for example, a battery or rectifier type power supply, into a high frequency square wave. An inductor L and capacitor C make up a series resonant coupling network used to couple the square wave inverter 10 to the load impedance 14. Load impedance 14 is connected as a damping element in the resonant circuit formed by inductor L and capacitor C. The frequency of the inverter or oscillator 10 is determined by a switching or frequency control circuit 16 in conjunction with an inverter input peak current sensor 18 and a rector L current rate of change (di/dt) sensor 20 incorporating a power control circuit 22 for readily adjusting the system's output power. The peak current sensor 18 measures the value of instantaneous current flowing in the inverter power switching devices and causes the inverter 10 to switch (change output polarity) when the inverter power stage current reaches a predetermined value. An advantageous feature of the coupling network placement is that it controls the rate of rise of inverter current under all load conditions. This allows the peak current sensor 18 performance specifications to be accurately defined.

The di/dt or current derivative sensor 20 senses the voltage across the coupling network inductor (L). The sensor's di/dt name comes from the well-known relationship between inductor voltage and rate of change of inductor current ($E = L \cdot di/dt$). The di/dt sensor functions by producing an output signal when the inductor voltage is below a certain value, while a power control adjustment of power control circuit 22 is used to vary this threshold of the di/dt sensor 20. Switching control 16 combines the output of the two sensors 18 and 20 in an 'or' type circuit. By this means, the first sensor to produce an output during an inverter half cycle causes the inverter 10 to switch to the next half cycle. Thus, the switching control 16 controls the inverter frequency and is the only means provided for controlling the inverter operation.

Figure 2:
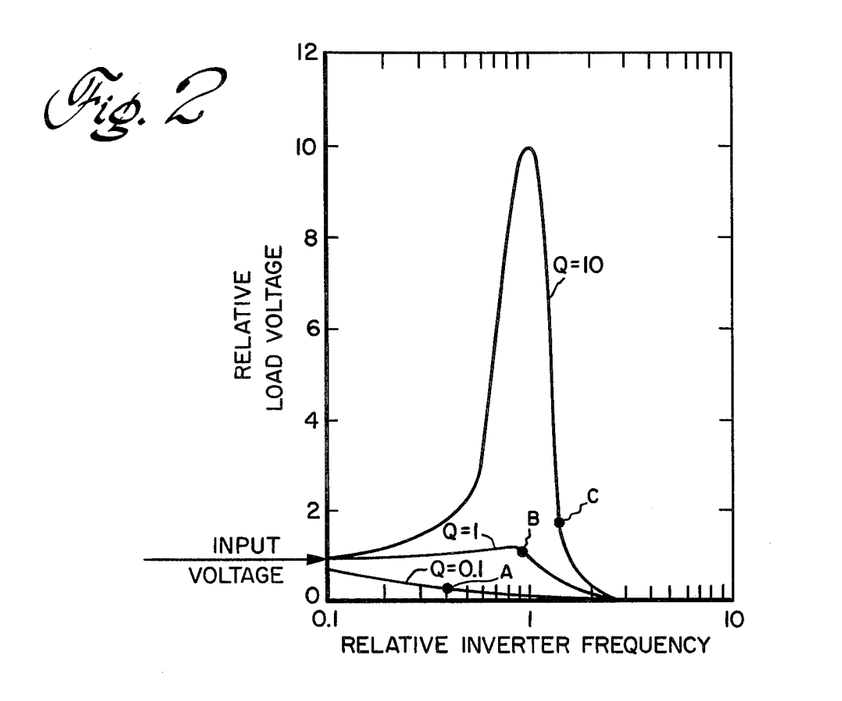
FIG. 2 is an idealized graph showing frequency response vs. inverter output voltage for the coupling network and load of the present invention.

FIG. 2 is an idealized graph of the combined coupling network and load frequency responsive vs. output systems voltage and is a useful tool in understanding the systems operation. Consider first the low Q case (Q=0.1) sketched on the graph. With this condition the load impedance is very low. Thus, at the indicated typical operating frequency, high inverter input current, high inductor voltage and low output voltage are realized and the system operating frequency (at point A) is determined by the setting of the peak current sensor. As the load impedance increases, the network Q also increases and resonant operating conditions become apparent.

The curve shown for Q=1 is a typical response curve for this weakly resonant condition. Notice that for certain frequencies the load voltage can exceed the network input voltage. This implies that at some time during an inverter half cycle the reactor voltage can become very low and in fact can reverse polarity and thereby provide a wide range of voltage conditions for the di/dt sensor input. Concurrently, it should be realized that the increased load impedance necessary to achieve moderate Q conditions will cause a decrease in the magnitude of the peak inverter input current. Thus, it is possible to select a di/dt sensor threshold voltage that will effect inverter switching before the peak current detector trip level is reached. As also noted in FIG. 2, the di/dt operating point (point B) is at a frequency that is higher than the resonant frequency (that is the frequency at which peak output voltage occurs). This is a natural consequence of the di/dt mode since the di/dt threshold must be set below the network peak output voltage. Therefore, the di/dt sensor trip point will be reached some time before the peak output voltage is reached.

The final curve (Q=10) shown in FIG. 2 illustrates a high Q operating situation. If the di/dt sensor alone were controlling the network output voltage, a high input current would result from the necessity of providing enough current to drive the network output capacitor to the resulting high output voltage. Thus, as the circuit Q rises and the output voltage rises accordingly, a point is reached where the peak current sensor regains control and limits any further rise in network output voltage. Again, as illustrated in FIG. 2, the operating point (point C) is on the high frequency side of resonance. This condition results from the fact that the peak current sensor trip point is reached in a time shorter than that required to reach peak resonant conditions.

Figure 3:
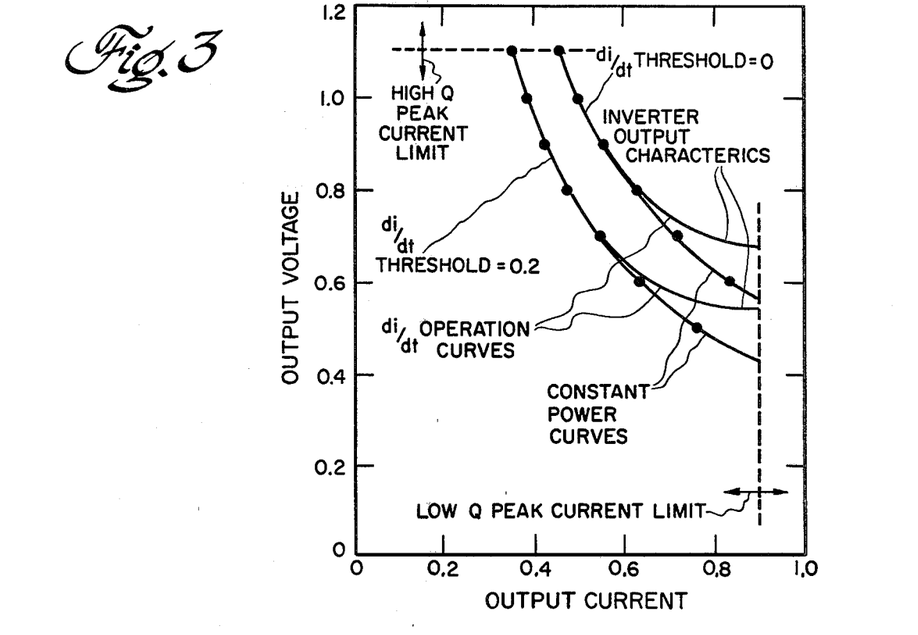
FIG. 3 illustrates the volt-ampere characteristics at the output of the inverter of the present invention.

FIG. 3 illustrates the output volt-ampere operating characteristics under the guidelines just illustrated. Under short circuit or very low output impedance conditions, such as the Q=0.1 line of FIG. 2, the peak current sensor is operative to control the output current. This operating condition is illustrated by the right side peak current limit region of FIG. 3. Likewise when the system operates with a very high impedance load, such as illustrated by the Q=10 curve of FIG. 2, the peak current sensor is operative to limit the maximum output voltage. This operating region is indicated at the upper left part of the FIG. 3 graph. In moderate Q area, the switching of the output current is affected by the di/dt sensor. This mode of operation is shown in between the low and high Q operating areas of FIG. 3 and is illustrated by the Q=1 curve of FIG. 2.

In the moderate Q mode of FIG. 3, there are a plurality of di/dt curves corresponding to different thresholds of the current derivative sensor. As is more fully explained in Walker U.S. Pat. No. 4,060,752, a di/dt curve corresponds approximately to a constant power curve. For simplicity sake, FIG. 3 includes only two di/dt curves, although it will of course be appreciated that the present invention provides for a continuously adjustable di/dt threshold over a range of values. Instead of being limited to a single power curve for the di/dt mode as the Walker system is, the present invention allows the di/dt threshold to be adjusted so as to provide a plurality of curves having approximately constant power output. These features provide near ideal characteristics for ballasting and dimming gas discharge lamps.

Figure 4:
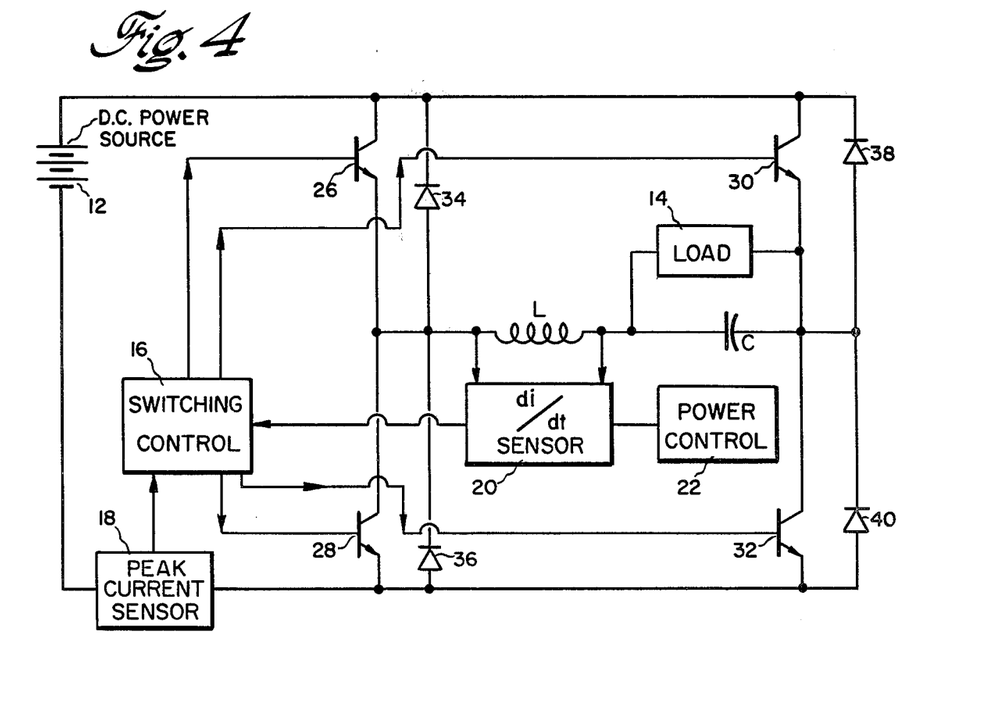
FIG. 4 illustrates an embodiment of the present invention which uses a full bridge circuit.

FIG. 4 illustrates an embodiment of the present invention using a full bridge circuit as the inverter power stage, employing four transistors 26, 28, 30, 32. The circuit operates from signals generated by the switching control 16, which alternately causes transistors 26 and 32 to conduct on one half cycle, while transistors 28 and 30 are cut off, and to cause transistors 28 and 30 to conduct on the next half cycle, while transistors 26 and 32 are cut off. Commutation of the output voltage is effected by alternately switching conduction between the pairs of transistors. Diodes 34, 36, 38 and 40 provide a means of circulating reactive coupling network currents which flow after each square wave transition. The series resonant circuit formed by inductor L and capacitor C bridges the transistors and is used to couple the load 14, connected in parallel with capacitor C, to the transistor switches. Peak current sensor 18 may be connected in series with power source 12 and the rate of current change in reactor L may be detected by di/dt sensor 20.

Figure 5:
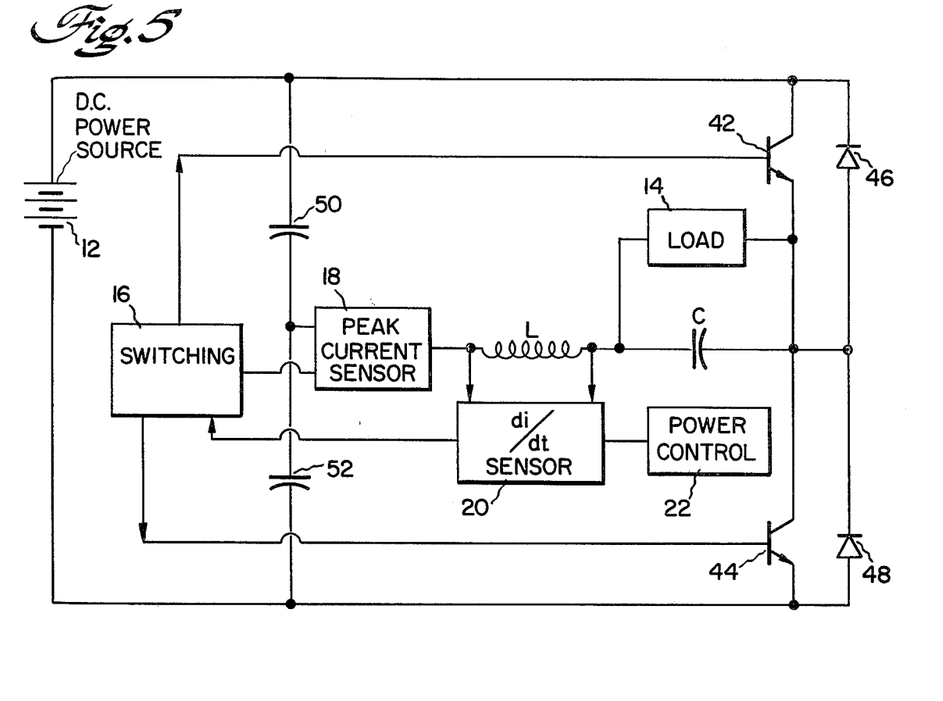
FIG. 5 shows an alternate embodiment of the present invention which uses a half bridge circuit.

FIG. 5 shows an alternate form of inverter power stage configuration which takes the form of a half bridge circuit employing two transistors 42 and 44, associated diodes 46 and 48 and capacitors 50 and 52. Capacitors 50 and 52 form an AC center tap of the DC power source. Signals from the switching control alternately cause Q1 and Q2 to conduct. The resulting square wave voltage, which is impressed across the coupling network and load, has a peak value of one half the DC power source. As in the previous example diodes 46 and 48 carry the reverse flowing reactive current from the coupling network after each square wave transition.

Figure 6:
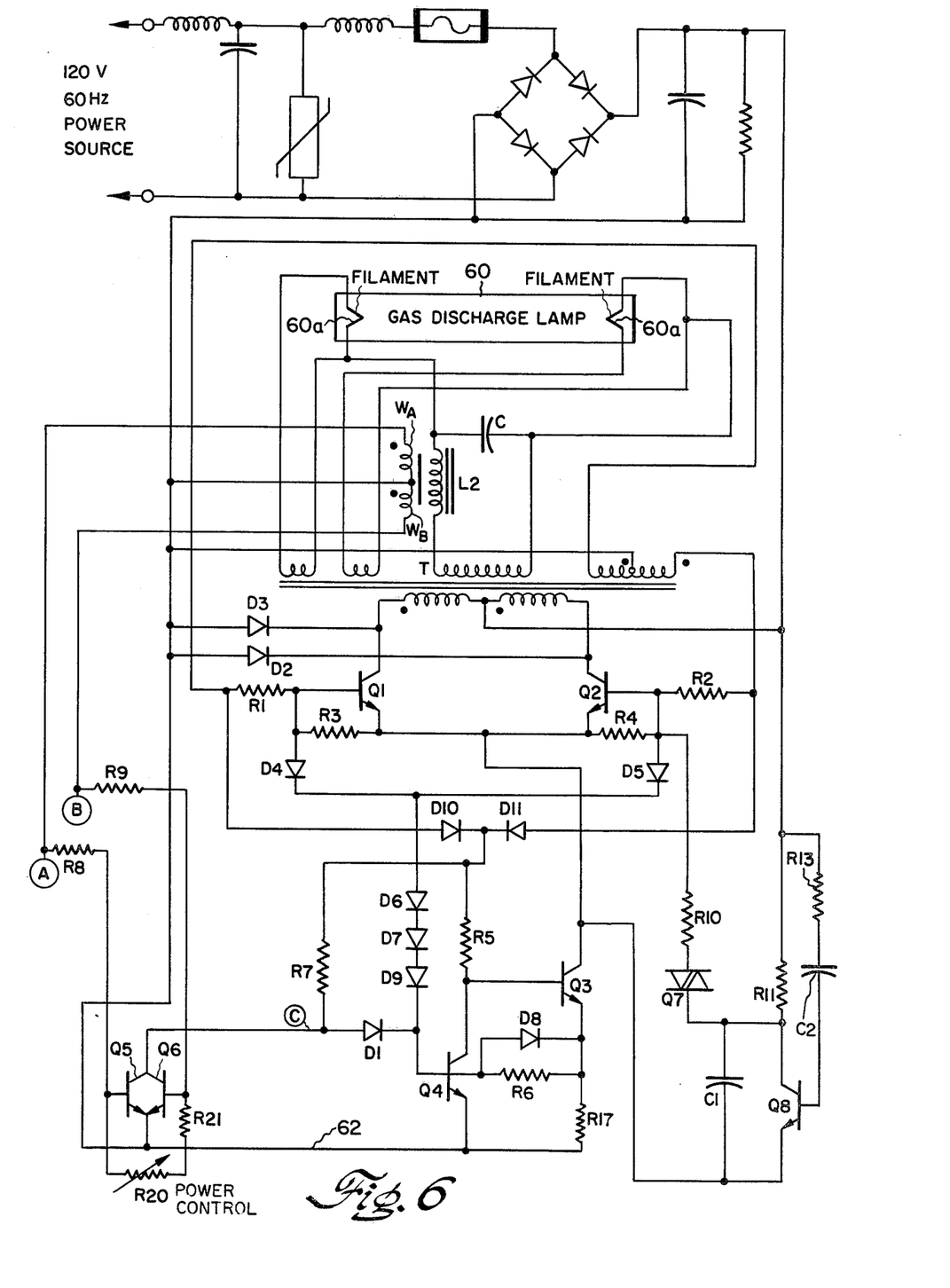
FIG. 6 shows a complete schematic of one preferred electronic ballast embodiment of the present invention which uses both a peak current control and a current derivative control.

FIG. 6 is a preferred embodiment of the peak current and di/dt controlled electronic ballast of the present invention. This circuit is an improvement of the circuit of FIG. 6 described in the aforenoted U.S. Pat. No. 4,060,752, and the operation of this circuit will be discussed only to the extent necessary to supplement the discussion which appears in that patent, the subject matter of which is incorporated by reference. To facilitate a comparison of the circuit of the present invention to the circuit as shown in FIG. 6 of U.S. Pat. No. 4,060,752, like components have been identified with like reference characters. It will be noted that the induction, ionized electrodesless gas discharge lamp 100 shown in U.S. Pat. No. 4,060,752 has been replaced by a conventional cathode operated gas discharge lamp 60 driven through transformer T. The use of transformer T provides added flexibility in designing the coupling network and in matching single and multiple combinations of lamps to various primary 60 hertz voltage levels. With the transformer in place, the gas discharge lamp filaments 60a voltages and the control circuit voltage (provided by T1 in the original circuit) is readily obtained by separate transformer T windings of appropriate turn ratios. Of course, the invention will function in the manner described with other loads such as the electrodeless induction ionized lamps shown in U.S. Pat. No. 4,060,752.

In order to more fully appreciate the significance of the changes to the di/dt control circuit of U.S. Pat. No. 4,060,752 and the advantageous manner in which the variable di/dt control of the present invention is implemented, the operation of the di/dt sensor will now be described with reference to FIG. 6. It should be noted that the di/dt threshold or trip point is defined as the point at which voltages at points A and B drop to a low enough value to turn both Q5 and Q6 off. The di/dt sensor or detector consists of transistors Q5 and Q6; resistors R7, R8, R9, R21; variable resistor R20; diode D1; and the windings $W_A$ and $W_B$.

In operation, if the voltage across winding $W_A$ is positive at the dotted end thereof, a current will flow to point A and through resistor R8, turning on transistor Q5. Likewise, when the voltage across winding $W_B$ is positive at the end without the dot, a current will flow to point B and through resistor R9, turning on transistor Q6. As should be readily appreciated, the voltages at point A and point B (obtained from coupling inductor L2) are always equal in magnitude and opposite in polarity, as indicated by the L2 phasing dots, with the polarity changing each inverter half cycle. When the voltage at point A drops below a predetermined threshold value, transistor Q5 will turn off. At the same time the voltage at point B is equal in magnitude, but of opposite polarity, such that Q6 is not conducting. Thus, point C is not connected to ballast common line 62, as it would be whenever either one of Q5 or Q6 conducts. Under this condition, path for current which flows through R7 is maintained through diode D1 and causes transistor Q4 to turn on or conduct. As described in more detail in U.S. Pat. No. 4,060,752, turn on of transistor Q4 will cause a transition or reversal of the voltage applied to the interconnected coupling network components L2 and C and gas discharge lamp 60. With the next half cycle thus established, the voltage polarities of windings WA and WB reverse and Q6 becomes the active threshold detector.

The turns ratio of windings $W_A$ and $W_B$ insure that the voltages at points at A and B are of the appropriate magnitude. Resistors R8 and R9 should be of the same value to avoid discontinuous shifts in frequency caused by different thresholds of switching depending upon the direction of inductor L2 current flow. This FIG. 6 di/dt or current derivative detector actually detects voltage which is proportional to the derivative of the inductor current.

The addition of resistor R21 and variable resistor R20 allows the threshold value to be adjusted, while insuring that point A and point B do not differ in threshold value. For analysis purposes, consider the case where R20 and R21 are both equal to zero. Since the voltage at point A and the voltage at point B are always of the same magnitude and opposite polarity, and since resistors R8 and R9 are of equal value, the voltage at the bases of the two transistors Q5 and Q6 will be zero with respect to their emitters. Under this condition, the transistors would always be in the tripped state. On the other hand, if the resistors are of very high values, the bases of the two transistors will then be isolated. This would be a maximum power setting, corresponding in operation to the circuit of U.S. Pat. No. 4,060,752, wherein the bases of Q5 and of Q6 are not coupled to each other.

In the preferred embodiment, resistors R20 and R21 have values such that an amount of current which would otherwise turn on one of the transistors is shunted through the threshold adjusting circuit of R20 and R21. The lower the resistance setting on potentiometer R20, the more current will be shunted away from the base emitter junctions of the transistors. A higher voltage at point A or point B will then be necessary to reach the turn on point at the corresponding transistor. Fixed resistor R21 fixes the maximum threshold voltage and therefore the minimum ballast output power. By varying the combined value of R20 and R21, a variable di/dt set point is realized.

Varying the di/dt threshold causes the inverter load power to be varied by shifting the operating frequency, and therefore the inverter output volt-ampere relationship, to the unique characteristic associated with the particular di/dt threshold set point.

It is thus seen that the di/dt sensing circuit of the present invention has two input terminals A and B and an output terminal C, as well as a variable threshold adjusting circuit or power control 20 connected between the two inputs. The output terminal C provides an indication signal current which is the current through transistors Q5 and Q6. When both Q5 and Q6 are turned off, this indication signal current is zero, i.e. the di/dt value is below the set threshold or switching point of the transistors. Each of the transistors Q4, Q5 and Q6 may be thought of generally as switching devices having 3 terminals, a control or base terminal, an output or collector terminal and an emitter or reference terminal. When Q5 and Q6 are off, the current from R7 flows through D1 and turns on the peak current control circuit Q4.

Figure 7:
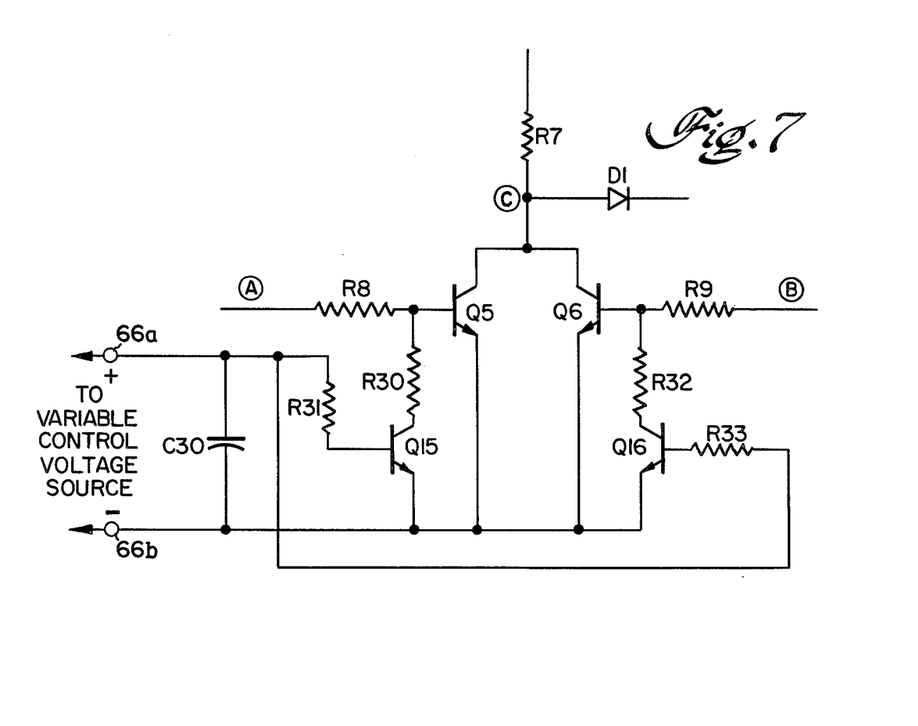
FIG. 7 shows an alternate dimming control circuit useful for implementing the present invention.

FIG. 7 shows an alternate embodiment of a dimming control circuit in accordance with the present invention, which may advantageously be used to remotely control the dimming function. A variable control voltage signal from a remote source (not shown) is applied, with the polarity indicated, to the circuit input terminals 66a and 66b. Capacitor C30 is connected across the input terminals and is used to remove high frequency noise signals from the control voltage signal so that the dimming circuit will not jitter. The input signal is applied to the respective bases of transistors Q15 and Q16 through voltage dropping resistors R31 and R33, respectively. Transistors Q15 and Q16 act as variable resistors. The higher the input control signal voltage, the lower the Q15 and Q16 device impedance become. Thus, resistances R8 and R30 and transistors Q15 and resistances R9, R32 and transistor Q16 form variable voltage dividers and can be used to adjust the trip point of the di/dt sensor with respect to the A and B inductor voltages. Resistances R30 and R32, connected respectively between the collectors of transistors Q15, and Q16 and the bases of transistors Q5 and Q6, are used to set the maximum di/dt threshold voltage and thus the minimum system output power. Resistances R31 and R33 convert the remote voltage source to two current sources which are used to provide balanced base currents for transistors Q15 and Q16.

While the present invention has been illustrated and described with reference to particular embodiments thereof, it will be understood that these are for illustrative purposes only and that modifications may be made by those skilled in the art without departing from the true spirit and full scope of the invention as defined in the appended claims.

What is claimed is:

1. A circuit for starting and varying the output of a gas discharge lamp comprising:

a variable frequency power source having an output;
a resonant matching network connected to the power source output, the matching network operative to transfer power from the source to the output of the network when the network output is loaded by a gas discharge lamp; and
control circuit means connected to said power source for controlling the frequency of the power source, including:
(i) a first sensing circuit operative to sense a signal representing a time derivative of a current flow in the matching network and produce an indication signal at an output of said circuit, the indication signal being zero whenever the time derivative is below a set threshold value of said first sensing circuit, and wherein the indication signal operates to control the frequency of said power source; and
(ii) a variable threshold adjustment means coupled to said first sensing circuit for adjusting the setting of said threshold value and thereby varying said output of the lamp.

2. The circuit of claim 1, wherein the matching network is a resonant circuit having an inductor connected in series with a capacitor, the capacitor being connected in parallel with a gas discharge lamp, and the time derivative signal sensed by the first sensing circuit is the voltage across the inductor.

3. The circuit of claim 1, wherein the variable threshold adjustment means includes at least a first variable impedance device.

4. The circuit of claim 3, wherein said control circuit includes first and second input terminals, and said first sensing circuit includes:

a first switching circuit device having at least a control terminal and an output terminal;
a second switching circuit device having at least a control terminal and an output terminal;
the control terminals of the first and second switching devices being associated respectively with said first and second control circuit input terminals, each of the switching devices being in a first conductive state or a second nonconductive state depending on the relationship between:
(1) an input signal at the associated input terminal; and
(2) a threshold value established by the setting of the variable impedance device.

5. The circuit of claim 4, wherein the variable impedance device is an adjustable resistor, the adjustable resistor being connected so as to vary the resistance between the control terminal of the first switching device and the control terminal of the second switching device.

6. The circuit of claim 5, including means for applying a first signal to the first input terminal of the control circuit equal in magnitude and opposite in polarity to a second signal input applied to the second input terminal of the control circuit.

7. The circuit of claim 5, including means for connecting the indication signal to a control terminal of a third switching device, said third switching device being a semiconductor device, and further including a source of turn-on current connected to the junction of the control circuit output at which the indication signal appears, and the control terminal of the third switching device.

8. The circuit of claim 7, wherein the control circuit further comprises a second sensing circuit means for sensing a peak current and controlling the frequency of the power source whenever the input current to the power source reaches a first limit.

9. The circuit of claim 4, wherein the threshold adjustment means further comprises a second variable impedance device, and each of the first and the second variable impedance devices is a controlled impedance variable as a function of an input control signal.

10. The circuit of claim 9, wherein each of the first and second variable impedance devices is a semiconductor device connected between a control terminal of an associated one of the first and second switching devices and a circuit ground.

11. A control circuit having a first input terminal and a second input terminal and an output terminal, the control circuit comprising:
 a first switching device having at least a control terminal coupled to said first input terminal, and an output terminal;
 a second switching device having at least a control terminal coupled to said second input terminal, and an output terminal;
 said output terminals of the first and the second switching devices being connected in common to provide the control circuit output terminal; and
 variable threshold adjusting means connected between the control terminals of said first and second switching devices for setting the threshold switching points of said first and second devices such that the output signal at said circuit output terminal is determined by the switching points of said devices and dependent on the level of input signals applied to said first and second input terminals.

12. The circuit of claim 11, wherein each of the first and second switching devices is a semiconductor device whose conduction is dependent on the relation between:
 (a) the applied input signal at the input terminal associated with the switching device; and
 (b) the switching point set for that switching device by the variable threshold adjusting means.

13. The circuit of claim 12, wherein each of the first and second switching devices is conductive when the applied input signal at the input terminal associated with that switching device is equal to or greater than the switching point set for that switching device by said threshold adjusting circuit.

14. The circuit of claim 12, wherein the threshold adjusting means comprises a first variable impedance device, the switching point of said switching devices being dependent on the impedance setting of the first variable impedance device.

15. The circuit of claim 14, wherein the first variable impedance device is an adjustable resistor, the adjustable resistor being connected so as to vary the resistance between the control terminal of the first switching device and the control terminal of the second switching device.

16. The circuit of claim 15, further including means for applying a first signal to the first input terminal control circuit which is equal in magnitude and opposite in polarity to a second signal input applied to the second input terminal of the control circuit.

17. The circuit of claim 15, including a power source, a load and a matching network for matching the power source to the load and wherein the control circuit derives an indication signal at the control circuit output terminal for controlling the power supplied to the load, the indication signal being derived from the matching network.

18. The circuit of claim 15, including a power source, a load and a matching network for matching the power source to the load and wherein the control circuit derives an indication signal for controlling the power supplied to the load, the matching network providing a first signal to the first input terminal of the control circuit and a second signal to the second input terminal of the control circuit, the first and second signals being of equal magnitude and opposite polarity and the indication signal being dependent on the first and second signals.

19. The circuit of claim 18, wherein the matching network includes a resonant circuit, said indication signal being derived from the resonant circuit, and the load includes a gas discharge lamp.

20. The circuit of claim 19, wherein the resonant circuit comprises a capacitor and an inductor in series, said capacitor being connected in parallel with the gas discharge lamp and the indication signal being a function of the time derivative of current flowing through the inductor.

21. The circuit of claim 20, wherein the indication signal is connected to a control terminal of a third switching device, said third switching device being a semiconductor device, and further including a source of turn-on current connected between the junction of the control circuit output terminal and the control terminal of the third switching device such that the turn-on current turns on the third switching device only when both of the first and second switching devices are turned off.

22. The circuit of claim 21, wherein the control circuit operates to control the frequency of the power source, and further comprising a peak current circuit operatively connected for controlling the frequency of the power source whenever an input current of the power source reaches a first limit.

23. The circuit of claim 15, including a power source, a load and a matching network for matching the power source to the load and wherein the control circuit derives an indication signal for controlling the power supplied to the load, the load including a gas discharge lamp, and further comprising a peak current circuit operatively connected for controlling the frequency of the power source whenever an input current of the power source reaches a first limit.

24. The circuit of claim 15, including a power source, a load and a matching network for matching the power source to the load and wherein the control circuit derives an indication signal for controlling the power supplied to the load, the load being a gas discharge lamp, the matching network including a resonant circuit and the first and second input terminals of the control circuit being connected to the resonant circuit.

25. The circuit of claim 14, wherein the threshold adjusting means comprises a second variable impedance device, and each of said first and said second variable impedance devices is a controlled impedance variable as a function of an impedance control signal.

26. The circuit of claim 25, including means for applying a first signal to the first input terminal of the control circuit is equal in magnitude and opposite polarity to a second signal input applied to the second input terminal of the control circuit.

27. The circuit of claim 25, including a power source and load and a matching network for matching the power source to the load wherein the control circuit derives an indication signal for controlling the power supplied to the load, the indication signal being derived from the matching network.

28. The circuit of claim 25, including a power source and load and a matching network for matching the power source to the load wherein the control circuit derives an indication signal for controlling the power supplied to the load, the matching network providing a first signal applied to the first input terminal of the control circuit and a second signal applied to the second input terminal of the control circuit, the first and second signals being of equal magnitude and opposite polarity and the indication signal is dependent on the first and second signals.

29. The circuit of claim 28, wherein the matching network includes a resonant circuit, said indication signal being derived from the resonant circuit, and the load includes a gas discharge lamp.

30. The circuit of claim 29, wherein the resonant circuit comprises a capacitor and an inductor, the capacitor being connected in parallel with the gas discharge lamp and the indication signal being a function of the time derivative of current flowing through the inductor.

31. The circuit of claim 30, wherein the indication signal is connected to a control terminal of a third switching device, said third switching device being a semiconductor device, and further including a source of the turn-on current connected to the junction of the control circuit output terminal and the control terminal of the third switching device such that the turn-on current turns on the third switching device only when both of the first and second switching devices are turned off.

32. The circuit of claim 31, wherein the control circuit operates to control the frequency of the power source, and further comprising a peak current circuit for controlling the frequency of the power source whenever the input current of the power source reaches a first limit.

33. The circuit of claim 25, including a power source and load and a matching network for matching the power source to the load and wherein the control circuit derives an indication signal for controlling the power supplied to the load, the load including a gas discharge lamp, and further comprising a peak current circuit for controlling the frequency of the power source whenever the input current of the power source reaches a first limit.

34. The circuit of claim 25, including a power source and load and a matching network for matching the power source to the load and wherein the control circuit derives an indication signal for controlling the power supplied to the load, the load being a gas discharge lamp, the matching network includes a resonant circuit and the first and second input terminals of the control circuit being connected to the resonant circuit.

35. The circuit of claim 14, wherein the first switching device is turned on when the applied input signal at the first input terminal is greater than or equal to the switching point; the second switching device is turned on when the applied input signal at the second input terminal is greater than or equal to the switching point; and only one of the first and second switching devices can be on at a time.

36. The circuit of claim 35, wherein the threshold adjusting means is connected to change the switching point by shunting current away from the control terminals of the first and second switching devices and the first variable impedance device comprises a variable resistor connected across the control terminals of the first and second switching devices.

37. The circuit of claim 36, including:
a third switching device which is controlled by the output terminal of the control circuit;
a power source;
a gas discharge lamp;
and means for connecting the power source to power the gas discharge lamp, the amount of power to the gas discharge lamp being dependent on the setting of the threshold adjusting means.

38. The circuit of claim 36, wherein the threshold adjusting means further comprises:
a second variable impedance device, and each of the first and second variable impedance devices is a controlled resistance variable as a function of an impedance control signal.

39. The circuit of claim 38, wherein each of the conrolled resistances is a semiconductor device which varies the resistance between:
a control terminal of an associated one of the first and second switching devices; and
a circuit ground.

* * * * *